Sept. 14, 1937.  J. C. OLSEN  2,093,021
SEAL
Filed Oct. 12, 1933
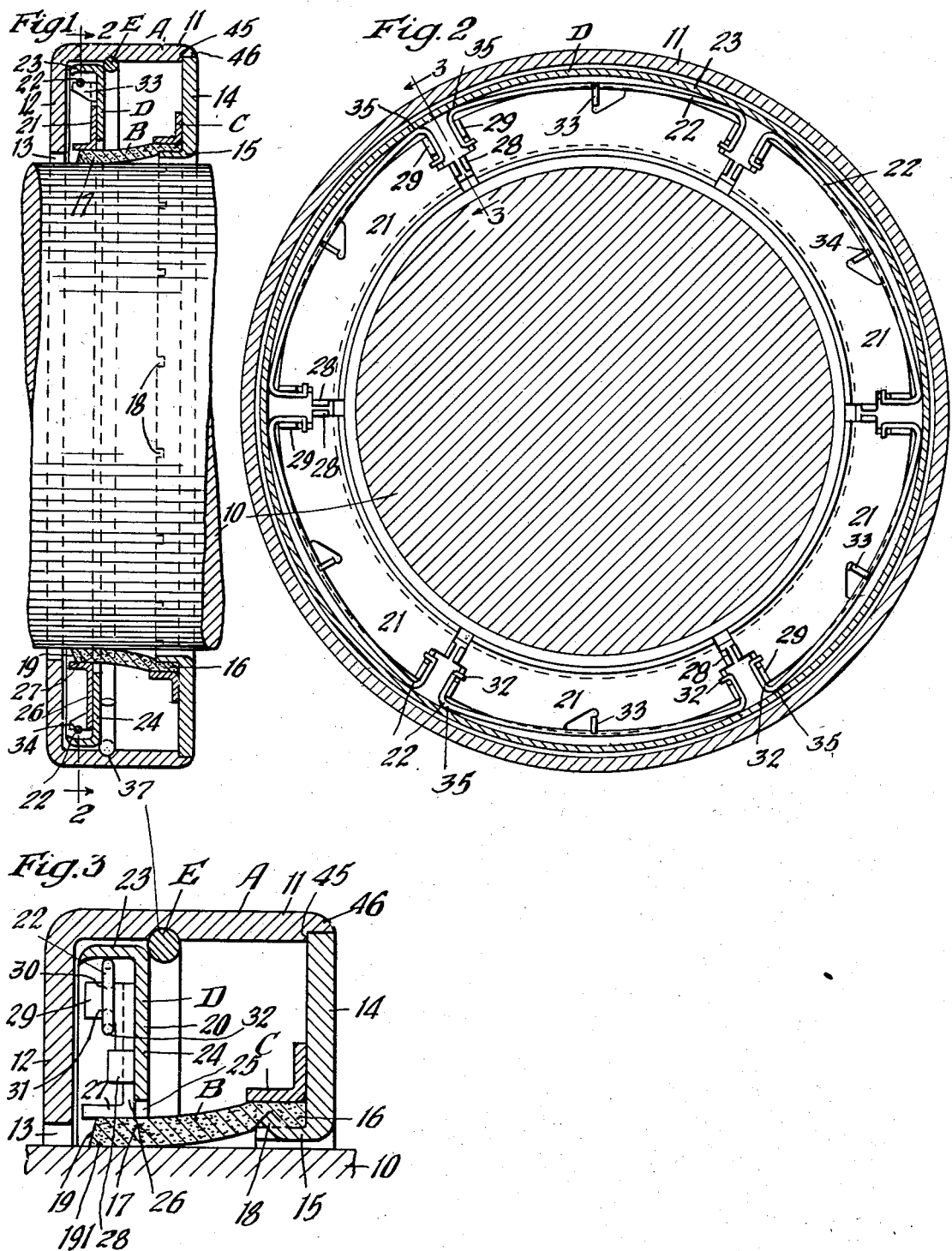
Inventor
John C. Olsen
By Joseph Harris
His Atty.

Patented Sept. 14, 1937

2,093,021

UNITED STATES PATENT OFFICE 2,093,021

SEAL

John C. Olsen, Chicago, Ill., assignor to Flexible Steel Lacing Company, Chicago, Ill., a corporation of Illinois Application October 12, 1933, Serial No. 693,255

13 Claims. (Cl. 288—1)

REISSUED
JUN 4 - 1940

This invention relates to improvements in seals, and more especially, but not exclusively, seals for rotatable shafts, commonly called oil seals.

In oil seals for shafting, it is well recognized that, where a flexible packing such as leather is employed, the packing should have a uniform pressure engagement with the shaft around the entire circumference and that this pressure should be relatively light so as to obtain a "feather-like" touch, particularly in the zone of the free edge of the packing that engages the shaft. Especially is the uniform but feather-like pressure important when employed with shafts rotating at relatively high speed in order to prevent scoring of the shaft and also to minimize friction and generation of heat.

Heretofore, many expedients have been employed with packings and more particularly leather packings or washers for exerting the constricting pressure around the shaft such as garter springs, metallic spring discs with slit fingers and the like. Such expedients, however, have not proven entirely satisfactory and have had limited scope of usefulness, particularly as respects high speed shafts, primarily on account of the inability to maintain continuous uniform pressure around the shaft and inability to compensate for any eccentricity that may be developed in the shaft under high speeds. Such former types of seals have also almost universally employed a leather washer having an axial sleeve section and a radial flange section with the latter clamped, as a result of which stresses are unavoidably set up in the washer, due to the sharp angular bend therein, which militates against the desired flexing of the sleeve portion in accommodating itself to any slight eccentricities of the shaft.

One object of this invention is to provide a seal for preventing the passage or leakage of oil or other lubricant, water or other foreign matter, lengthwise of a shaft and wherein is employed a flexible packing, preferably leather, having associated therewith contractile pressure means to maintain the seal joint not only uniformly and continuously completely around the shaft, but over an appreciable extended width or zone lengthwise of the shaft adjacent the free edge of the packing, the contractile pressure means being further characterized in that the pressure therefrom may be delicately regulated so as to minimize friction and possibility of scoring and equally effective with either slow speed or relatively high speed shafts.

Another object of the invention is to provide a seal of the character indicated in the preceding paragraph so arranged that the contractile pressure means, considered as an entirety, is adapted to float freely in a radial plane so as to insure maintenance of the uniformity of contractile pressure on the washer in any position of the shaft relative to the casing of the seal, regardless of whether the shaft occupies an exact axial position with reference to said casing or has an eccentric movement within tolerated limits when under rotation.

A further object of the invention is to provide an oil seal embodying a floating contractile pressure means or unit as indicated in the preceding paragraph combined with a flexible washer so formed and attached to the oil seal casing, that the washer is free from the usual right angular radial clamping flange and resultant stresses tending to stiffen it, to the end that the washer itself is freely flexible or adjustable in accordance with any eccentric movements of the shaft to the end that the area of contact between the washer and shaft is always maintained uniform.

Other objects of the invention are to provide an oil seal which may be economically manufactured and assembled; which may be sold, shipped and applied completely assembled as a unitary article; and in which provision is made in the construction and assembling of the parts to insure absolute accuracy of the relative intended positions of the parts of the unit.

Other objects of the invention will more clearly appear from the description and claims hereinafter following.

In the drawing forming a part of this specification, Figure 1 is a vertical, diametrical, sectional view showing a seal embodying the improvements in position relative to a rotating shaft, a portion of the latter being indicated. Figure 2 is a transverse, vertical, sectional view corresponding substantially to the line 2—2 of Figure 1. And Figure 3 is an enlarged, radial sectional view corresponding substantially to the line 3—3 of Figure 2.

In said drawing, a portion of a shaft is indicated at 10 with which the improved seal is adapted to cooperate, the improved seal comprising broadly, a sheet metal casing A; a packing or washer B; a washer clamping ring C; a floating contractile spring pressure unit designated generally by the reference D; and a locking ring E for the floating pressure unit D.

The shell or casing A is preferably comprised of a drawn cup shaped sheet metal member having an outer annular rim 11 and a radial flange 12, the latter being apertured as indicated at 13 so as to freely receive the shaft therethrough. As will be understood, the peripheral section 11 of the casing will be made of such shape, usually cylindrical, and size as to permit of a friction drive fit within the usual recess of the shaft housing and provide a sealed joint therewith. At its free edge, the peripheral section 11 is rabbetted so as to provide an inner shoulder 45 against which is seated the other section comprising the other member of the casing which is more or less in the form of an annular disc 14, having an inturned annular flange 15 encircling the shaft and having an interior diameter slightly greater than the diameter of the shaft. The casing member 14 is assembled with the other casing member against the shoulder 45 and the edge 46 of the cup shaped member squeezed down so as to rigidly and permanently unite the two casing members. In this connection, it will be observed that by providing a shoulder 45, absolute uniformity of the spacing between the radial walls 12 and 14 of the casing is assured and consequently accurate positioning of the other parts within the casing assured. Particular attention is directed to the formation of the inturned flange 15. Initially said flange is made of the same thickness as the radial washer section 14 and is formed with its inner diameter approximately equal to the diameter of the shaft to be entered therethrough. The flange is then bored so as to enlarge the axial shaft opening to provide the necessary clearance for the shaft in allowing for any off positioning or eccentric movements thereof. As obvious, this will result in a thinning of the flange 15 so that the outer diameter of the latter remains as small as consistently possible with the structural strength required of the casing. The purpose of maintaining the outside diameter of the inturned flange 15 at a minimum is to allow of the washer B being seated and sealed thereon with a minimum stretch or expansion of the clamped end of the washer and to bring the clamped section of the washer B as nearly in line as is possible with the free sealing edge thereof, as will be obvious from inspection of Figures 1 and 2. In this connection the drawing illustrates a seal for a two inch shaft wherein Figures 1 and 2 are twice the scale of the actual seal and Figure 3 is substantially four times the actual size. In actual practice, the inside diameter of the flange 15 will be approximately $2\frac{1}{32}''$ for a two inch shaft and the thickness of the flange 15 one sixteenth of an inch, so that the outside diameter of the flange is $2\frac{3}{32}''$. For shafts of other sizes, the seals will have proportionate dimensions, as will be understood.

The washer B, preferably of leather, is of substantially cylindrical form except for the slight stretching or expansion necessitated where the clamped end 16 thereof is seated over the flange 15, thus minimizing any internal strains within the washer and providing for the maximum flexibility thereof and particularly the capacity of the free or sealing zone portion 17 to float with the shaft. The clamping edge 16 of the washer is seated over the flange 15 as previously described and is clamped thereon by an angular ring C pressed thereover with a tight friction fit, said ring C being preferably of angular cross section as shown. To additionally secure the washer, the flange 15 is outwardly pressed at suitable spaced intervals therearound, as indicated at 18, so as to imbed the corners of the outward pressings 18 slightly into the leather, as clearly shown in Figure 3. As also clearly shown in the drawing, special provision is made at the free edge of the washer to augment the sealing effectiveness, by beveling the edge, as indicated at 19, inwardly and toward the side from which the oil or other lubricant normally tends to flow, that is, toward the left as viewed in Figures 1 and 3 where the seal is shown, to prevent escape of oil or other lubricant coming from the left. Heretofore so far as aware, no attention has been paid to the formation of the edge of the sealing washer. By beveling the same in the manner shown and described, pressure exerted in the zone of the free edge, while tending to compress the washer, cannot, however, result in any separation of the inner corner edge, indicated at 191 from the shaft, which is a defect inherent in prior types of seals. Should a gap between the free corner edge 191 of the washer and shaft occur, experience has demonstrated that the oil will get within said gap and gradually continue to work its way lengthwise of the shaft even between the sealed line of contact, presumably due to a squeezing action repeatedly closing up such gap. With the present construction shown, this danger is reduced to a minimum.

The floating pressure unit D comprises a floating metallic ring 20, and a plurality of arcuate pressure members 21—21, each having associated therewith a spring 22. The ring 20 is preferably in the form of a drawn cup shaped member having an annular flange 23 and radial flange 24, the latter being centrally apertured as indicated at 25 so as to provide the necessary clearance for the washer B, which is extended therethrough. The outside diameter of the flange 23 will be made such as to allow for movement of the ring in a radial plane within tolerated limits of eccentricity of the shaft, as will be understood.

Each of the pressure members 21 is preferably made of sheet metal formed with suitable dies, each said member having a radial web 26 and an arcuate inner flange 27, the interior diameter of the latter corresponding to the exterior diameter of the washer with which associated. At each end, the web section 26 is provided with longitudinally arranged small flanges 28 extending in the same direction as the flange 27, said flanges 28 functioning as shoulders adapted to engage each other to limit the constricting movement of the pressure members and also to prevent possibility of one pressure member 21 riding up at its ends over adjacent pressure members. Normally, adjacent pairs of shoulders 28 are very slightly spaced, approximately $\frac{1}{64}$ of an inch, the spacing being considerably exaggerated in Figure 2 to more clearly illustrate the construction. Hence, when the seal is off of the shaft, the contractile movement of the pressure members 21 will be limited by the radial shoulders 28 coming into contact with each other, thereby preventing collapsing of the washer even when impregnated with oil and soft and facilitating application of the seal to the shaft under all conditions. Outwardly of the shoulder flanges 28, each pressure member 21 at each end thereof is cut back and formed with spring attaching flanges 29—29, notched top and bottom as indicated at 30—31 to receive and retain in position the hook shaped ends 32 of the springs 22, which are engaged thereover. At the center of its outer edge, each pressure member 21 also has struck up therefrom a more or less triangular bearing flange 33 suitably notched to receive the wire spring 22 as indicated at 34 whereby, as will be apparent, each spring 22 is maintained in proper position with reference to its pressure element 21.

Each spring 22 is of relatively light spring wire and, when in place in operative position, of generally arcuate form on a radius somewhat greater than the outer radius of the pressure member so that each spring, at the ends of the arcuate portion proper, will have shouldered engagement, as indicated at 35—35 with the peripheral flange 23 of the floating ring, resulting in an equalized centrally applied pressure to the pressure member through the bearing shoulder 33. With this arrangement, it will be further observed that each pressure element 21 is adapted for individual rocking or angular adjustment with reference to its spring so that the pressure elements may readily adapt themselves to the washer and insure uniform pressure throughout the arcs of contact. Further, by forming the springs in the manner shown and described, the spring pressure may be made very light and accurately controlled since even an appreciable outward radial movement of one pressure element 21 with respect to the floating ring 20, will induce only a relatively slight additional flexing of the long arc of the spring 22.

Referring to Figures 1 and 3, it will be observed that the inner arcuate flanges 27 of the pressure members are of appreciable width or extent lengthwise of the shaft and that the same are extended slightly beyond the free edge of the washer and also overlie the edge zone of the latter for an appreciable distance so as to insure a relatively wide band or zone of contact between the pressure elements and the washer which in turn insures a correspondingly wide band or zone of surface contact between the washer and the shaft. With this arrangement, a relatively feather-like pressure may be maintained on the washer and, on account of the wide band of sealing contact between the latter and shaft, an exceedingly effective and efficient seal is obtained without danger of scoring or generation of excessive heat. It will further be observed that not only is each pressure element 21 independently adjustable but that the entire set of pressure elements floats or is adjustable in their entirety in a radial plane so that even in an eccentric position of the shaft, the uniformity of pressure around the entire circumference of the washer will be maintained as contra-distinguished from any arrangement where the spring pressure is exerted between a pressure element and the fixed wall of a casing where, in an eccentric position of the shaft, pressure elements to one side would be under increased spring pressure and those on the other side would be under decreased spring pressure.

The floating pressure unit D is maintained in proper position by means of the spring wire ring E, which is sprung into place in an annular groove 37 formed on the interior of the casing section 11, said ring E being so located that the floating ring 20 may move relatively freely without, however, permitting it to shift unduly in an axial direction. Inasmuch as the washer B is positively held against rotation by the clamping ring C and lugs 18, the floating pressure unit D will be retained against rotation within the casing.

In the drawing, six pressure elements and associated springs are shown which will preferably be the number used for a two inch shaft seal. As will be understood, however, the number of said pressure elements may be varied, the essential feature being that they shall be arranged in a circular series so as to provide a substantially complete and relatively wide band of contact with the washer.

Throughout the preceding description, the seal has been described with reference to a rotating shaft only but it is obvious that the seals may be used with reciprocating rods or pistons wherein a sealing effect is desired and where the term shaft is hereinafter used in the claims, it is to be understood that the same is used generically to include both rotating shafts and reciprocating rods or shafts unless the context clearly indicates otherwise. Furthermore, the improved seal has been described with particular reference to preventing the passage of oil or lubricant therethrough but it is obvious that the seal is effective for preventing the passage therethrough of any liquid or semi-liquid or foreign matter generally such as water and dust.

Although the preferred manner of carrying out the invention has herein been shown and described, the same is merely illustrative and all changes and modifications are contemplated that come within the scope of the claims appended hereto.

What is claimed is:

1. A seal for a shaft rotatable within a relatively fixed housing, said seal comprising: a generally annular metallic casing having an outer peripheral wall, axially spaced side walls apertured for the accommodation of a shaft therethrough, one of said walls having an integral circular flange extending axially inwardly of the casing and of slightly greater inside diameter than the shaft to be accommodated; a one piece flexible packing having a shaft-engaging sleeve section at one end and an enlarged circular section at the other end encircling said circular flange and sealed therewith; and means for yieldingly constricting said sleeve section of the packing to provide a sealed joint with the shaft, said means including a circularly arranged series of pressure elements and spring means co-acting therewith.

2. A shaft seal comprising: a generally annular metallic casing having an outer peripheral wall, axially spaced side walls apertured for the accommodation of a shaft therethrough, one of said walls having an integral circular flange extending axially inwardly of the casing, said flange being of slightly greater inside diameter than the shaft to be accommodated and of reduced thickness relative to the wall with which it is integrally formed to provide a minimum outside diameter; a flexible packing having a shaft-engaging sleeve section at one end and a slightly enlarged circular section at the other end to fit over said flange; means, separate from the casing and encircling said circular section of the packing, for sealing said circular section with said flange; and means yieldingly constricting said sleeve section of the packing to provide a sealed joint with the shaft.

3. A seal of the character described comprising: a casing having axially spaced side walls apertured for the accommodation of a shaft therethrough; a flexible packing within the casing clamped with a sealing engagement thereto, said packing having a shaft-engaging sleeve section; and means for constricting said sleeve section in the zone of its free edge comprising: a floating carrier and a plurality of independent, spring-influenced pressure elements carried thereby, said elements surrounding the packing and engaging therewith and all of said elements being movable as an entirety with said carrier.

4. A seal of the character described comprising: a casing having axially spaced side walls apertured for the accommodation of a shaft therethrough; a flexible packing on the interior of said casing and clamped thereto to provide a seal therewith, said packing having an axial sleeve portion to engage the shaft; a plurality of circularly arranged pressure elements encircling and engaging said sleeve section of the packing; a carrier within the casing movable in a radial plane with respect thereto; and spring means interposed between said carrier and pressure elements, all of the latter being bodily movable in unison with the floating carrier.

5. A seal of the character described, comprising: a casing having axially spaced side walls apertured for the accommodation of a shaft therethrough, one of said walls being provided with an inturned annular flange; a flexible packing of generally cylindrical form having one edge portion thereof telescoped over said flange and sealed therewith, the other edge portion being adapted to engage the shaft; and a floating pressure unit including a plurality of independent elements in a circular series within the casing having cooperative engagement with said sleeve section in the zone of the free edge of the latter.

6. A seal of the character described, comprising: a casing having axially spaced side walls apertured for the accommodation of a shaft therethrough, one of said walls having an inturned flange around the aperture thereof; a flexible packing of substantially cylindrical form having one edge portion engaged over and secured to said inturned flange; a plurality of independent circularly arranged pressure elements cooperable with the free edge of the sleeve section of said packing, said elements engaging the latter over a relatively wide band and extended also beyond the free edge of the packing; and spring means cooperable with said pressure elements normally urging the latter radially inward.

7. A seal of the character described, comprising: a casing having axially spaced side walls centrally apertured for the accommodation of a shaft therethrough, one of said walls having an integral inturned annular flange of inner diameter slightly greater than the shaft to be accommodated; a flexible packing of substantially cylindrical form having one edge portion engaged over and sealed with said flange, the opposite free edge of said packing being beveled inwardly and toward that side of the seal from which the oil or other foreign matter normally tends to enter; and a circularly arranged series of independent spring influenced pressure elements engaging the free edge portion of said packing.

8. As an article of manufacture, a pressure element for an oil seal, said pressure element being of generally arcuate form with a radially extending web and an inner arcuate flange, said element at each end thereof being provided with shoulder flanges and also with spring retaining flanges, said element having a spring bearing flange at its center on the outer edge thereof.

9. As an article of manufacture, a pressure element for an oil seal, said pressure element being of generally arcuate form with a radially extending web and an inner arcuate flange, said element having at each end thereof a shoulder flange adapted to cooperate with a corresponding flange of an adjacent element, said element having also means thereon for engagement with a spring.

10. As an article of manufacture, a pressure element for an oil seal, said pressure element being of generally arcuate form with a radially extending web and an inner arcuate flange, said element having an integrally formed spring bearing flange at the center of the outer edge of said web.

11. A seal for a shaft rotatable within a relatively fixed housing, said seal comprising: a generally annular metallic casing having an outer peripheral wall, axially spaced side walls apertured for the accommodation of a shaft therethrough, one of said walls having a circular flange extending axially inwardly of the casing and of slightly greater inside diameter than the shaft to be accommodated; a flexible packing having a shaft-engaging sleeve section at one end and an offset circular section at the other end, the latter section encircling said circular flange; means for sealing said circular section of the packing with said circular flange; and means for yieldingly constricting said sleeve section of the packing to provide a sealed joint with the shaft, said means including a circularly arranged series of pressure elements and a plurality of springs co-acting therewith.

12. A seal for a shaft rotatable within a relatively fixed housing, said seal comprising: a generally annular metallic casing having an outer peripheral wall, axially spaced, radially extending side walls apertured for the accommodation of a shaft therethrough, one of said walls, at its inner edge, having an integral cylindrical flange extending axially inwardly of the casing substantially parallel to and only slightly spaced from the shaft to be accommodated; a flexible packing having a shaft engaging sleeve section at one end and a relatively slightly outwardly offset cylindrical section at the other end embracing said cylindrical flange of the wall; means, separate from the casing and located between said cylindrical section of the packing and said peripheral wall of the casing, sealing said cylindrical section of the packing with said cylindrical flange; and means yieldingly constricting said sleeve section of the packing to provide a sealed joint with the shaft.

13. As an article of manufacture, a floating constricting unit for a shaft packing adapted to be housed within a casing, said unit comprising: a metal ring of substantially right angle cross section with one flange thereof constituting the periphery of the ring and the other flange extending radially inward therefrom; a circularly arranged series of independent sheet metal pressure elements slidably mounted on said radial flange of the ring, each of said elements being also of substantially right angle cross section with one flange extending radially and the other of arcuate formation, the arcuate flanges being adapted to engage the packing; and a spring interposed between each said pressure element and said peripheral flange of the metal ring.

JOHN C. OLSEN.